(12) United States Patent
Orban

(10) Patent No.: US 10,662,709 B2
(45) Date of Patent: *May 26, 2020

(54) LOCAL ELECTRICAL ROOM MODULE FOR WELL CONSTRUCTION APPARATUS

(71) Applicant: Schlumberger Technology Corporation, Sugar Land, TX (US)

(72) Inventor: Jacques Orban, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/697,093

(22) Filed: Sep. 6, 2017

(65) Prior Publication Data

US 2019/0071929 A1 Mar. 7, 2019

(51) Int. Cl.
| | | |
|---|---|---|
| *E21B 7/02* | (2006.01) | |
| *E21B 15/00* | (2006.01) | |
| *F16L 1/06* | (2006.01) | |
| *E21B 19/15* | (2006.01) | |
| *E21B 19/087* | (2006.01) | |
| *E21B 17/02* | (2006.01) | |
| *H02G 1/00* | (2006.01) | |

(52) U.S. Cl.
CPC ............... *E21B 7/023* (2013.01); *E21B 7/02* (2013.01); *E21B 15/003* (2013.01); *E21B 17/02* (2013.01); *E21B 19/087* (2013.01); *E21B 19/155* (2013.01); *F16L 1/065* (2013.01); *H02G 1/00* (2013.01)

(58) Field of Classification Search
CPC . E21B 7/02; E21B 7/023; E21B 15/00; E21B 15/003
See application file for complete search history.

(56) References Cited

U.S. PATENT DOCUMENTS

| | | | |
|---|---|---|---|
| 421,781 A | 12/1899 | Stoughton | |
| 3,270,267 A | 8/1966 | Nolte, Jr. | |
| 3,802,137 A * | 4/1974 | Armstrong | E21B 15/003 173/151 |

(Continued)

FOREIGN PATENT DOCUMENTS

| | | |
|---|---|---|
| JP | H0413543 A | 1/1992 |
| WO | 2007019292 A2 | 2/2007 |

(Continued)

OTHER PUBLICATIONS

Cat® MD6640 Rotary Blasthole Drill, Brochure, 4 pages, 2013.

(Continued)

*Primary Examiner* — Giovanna C Wright
(74) *Attorney, Agent, or Firm* — Rachel E. Greene

(57) ABSTRACT

An apparatus having a skid, a boom having a first end attached to the skid and pivotable around an axis proximate the first end such that a second end of the boom raises and lowers relative to the skid, and a room mounted on the skid. The apparatus may further include a raisable apparatus supported by the second end of the boom and having one or more plug panels configured to connect to one or more first cables. The apparatus may also include second cables routed from the raisable apparatus and attached to and supported at least in part by the boom, wherein the second cables may be configured to provide electrical power to the raisable apparatus.

20 Claims, 10 Drawing Sheets

(56) References Cited

U.S. PATENT DOCUMENTS

| | | | |
|---|---|---|---|
| 4,345,650 | A | 8/1982 | Wesley |
| 4,751,969 | A | 6/1988 | Klaeger |
| 4,795,893 | A | 1/1989 | Ugon |
| 5,292,108 | A | 3/1994 | Sutton |
| 6,268,574 | B1 | 7/2001 | Edens |
| 6,675,888 | B2 | 1/2004 | Schempf et al. |
| 6,731,562 | B2 | 5/2004 | Roohparvar |
| 6,971,457 | B2 | 12/2005 | Baird |
| 7,165,619 | B2 | 1/2007 | Fox et al. |
| 7,849,924 | B2 | 12/2010 | Surjaatmadja et al. |
| 8,299,748 | B2 | 10/2012 | Soma et al. |
| 8,332,106 | B2 | 12/2012 | Yuet et al. |
| 8,881,806 | B2 | 11/2014 | Xie et al. |
| 9,360,134 | B2 | 6/2016 | Orgeron et al. |
| 9,644,431 | B2 | 5/2017 | Myers et al. |
| 9,850,111 | B2 | 12/2017 | Trevisani |
| 2002/0175522 | A1 | 11/2002 | Wacknov et al. |
| 2007/0096538 | A1 | 5/2007 | Niemi et al. |
| 2007/0199872 | A1 | 8/2007 | Mueller et al. |
| 2008/0099197 | A1 | 5/2008 | Payne |
| 2008/0314579 | A1 | 12/2008 | Den Boer et al. |
| 2009/0188677 | A1 | 7/2009 | Ditta et al. |
| 2009/0214196 | A1 | 8/2009 | Bremnes |
| 2009/0283324 | A1 | 11/2009 | Konduc et al. |
| 2009/0321135 | A1* | 12/2009 | Vora ........................ E21B 15/00 175/57 |
| 2010/0089584 | A1 | 4/2010 | Burns |
| 2010/0143044 | A1 | 6/2010 | Kadaster et al. |
| 2011/0280104 | A1 | 11/2011 | McClung |
| 2011/0281447 | A1 | 11/2011 | Kano et al. |
| 2013/0140092 | A1* | 6/2013 | Warr ........................ E21B 7/02 175/219 |
| 2013/0180186 | A1 | 7/2013 | Konduc et al. |
| 2013/0315676 | A1 | 11/2013 | Orgeron et al. |
| 2014/0048286 | A1 | 2/2014 | Rojas et al. |
| 2014/0251623 | A1 | 9/2014 | Lestz et al. |
| 2015/0114652 | A1 | 4/2015 | Lestz et al. |
| 2015/0114717 | A1* | 4/2015 | Fortson ................ E21B 15/003 175/57 |
| 2015/0267487 | A1 | 9/2015 | Bujold et al. |
| 2015/0361784 | A1 | 12/2015 | Davis |
| 2016/0195911 | A1 | 7/2016 | Chapel et al. |
| 2016/0293294 | A1 | 10/2016 | Matlack et al. |
| 2017/0044894 | A1 | 2/2017 | Surowinski et al. |
| 2019/0049909 | A1 | 2/2019 | Krippner et al. |
| 2019/0051431 | A1 | 2/2019 | Orban et al. |
| 2019/0065789 | A1 | 2/2019 | Gonchar et al. |

FOREIGN PATENT DOCUMENTS

| | | | |
|---|---|---|---|
| WO | 2010070305 | A2 | 6/2010 |
| WO | 2017119896 | A1 | 7/2017 |

OTHER PUBLICATIONS

Loadmaster, "Land, Desert, Arctic, or Offshore Our Drilling Equipment is Meticulously Designed", www.loadmasterur.com, 38 pages, 2017.

Joy Global, General Specification: 320XPC Rotary Blasthole Drill, joyglobal.com, 4 pages, 2016.

Conductix Wampfler, "Giant Land-based Oil Rigs Become Mobile with Conductix-Wampfler Cable Reels", Jul. 18, 2016, 3 pages, http://www.conductix.us/en/news/2016-07-18/giant-land-based-oil-rigs-become-mobile-conductix-wampfler-cable-reels.

Nexans AmerCable, Zone 1 (EX) Rated Cable Assemblies: Offhsore Bridle Systems—Tender Assisted drilling Unit/Bridle and Festoon Systems, 4 pages, 2014, http://www.amercable.com/doc/catalogs/og/bridle.pdf.

Varhaug, "Subsea Infrastructure", Schlumberger, Oilfield Review 2016, 2 pages, 2016, http://www.slb.com/-/media/Files/resources/oilfield_review/defining_series/Defining-Subsea-Infrastructure.pdf?la=en&hash=C5D993CA2AF08B14F36ECFC7DD18CB9D48AF7F52.

P&H, P&H 320XPC Blasthold Drill, accessed via http://pdf.directindustry.com/pdf/joy-global-surface-mining-p-h-mining-equipment-i/p-h-320xpc/40115-154681.html; 6 pages, 2009.

Joy Global, 320XPC Rotary Blasthole Drill Product Overview, accessed via http://pdf.directindustry.com/pdf/joy-global-surface-mining-p-h-mining-equipment-i/p-h-320xpc/40115-378357.html; 8 pages, 2012.

Caterpillar, Land Righ SCR Power Podules, Caterpillar Inc., 4 pages, 1999.

Bentec Drilling Rigs. Brochure [online]. Bentec GmbH Drilling Oilfield Systems, Germany, Dec. 2016. Retrieved from the Internet: URL: https://www.bentec.com/wp-content/uploads/2016/12/Bentec_Drilling_Rigs_EN_122016.pdf See pp. 1-11.

* cited by examiner

LOCAL ELECTRICAL ROOM MODULE FOR WELL CONSTRUCTION APPARATUS

BACKGROUND OF THE DISCLOSURE

In the drilling of oil and gas wells, drilling rigs are used to create a well by drilling a wellbore into a formation to reach oil and gas deposits. During the drilling process, as the depth of the wellbore increases, so does the length and weight of the drillstring. A drillstring may include sections of drill pipe, a bottom hole assembly, and other tools for creating a well. The length of the drillstring may be increased by adding additional sections of drill pipe as the depth of the wellbore increases. Various electrically powered components of a drilling rig can be used to advance the drillstring into the formation.

Electrical power supplied to such components may be generated and distributed at the drilling rig. For example, power houses may be installed at the drilling rig to contain electrical power distribution devices, breakers, variable frequency drives (VFD), motor starters, programmable logic controllers (PLC), data acquisition systems, and other electrical devices. One of these houses (e.g., a local electrical room (LER)) may be linked to a rig central package for controlling the power distribution and control at/near the central package. In the case of a walking rig, the LER may be attached to and move with the central package.

SUMMARY OF THE DISCLOSURE

This summary is provided to introduce a selection of concepts that are further described below in the detailed description. This summary is not intended to identify indispensable features of the claimed subject matter, nor is it intended for use as an aid in limiting the scope of the claimed subject matter.

The present disclosure introduces an apparatus including a skid, a boom, and a room. The boom has a first end attached to the skid and pivotable around an axis proximate the first end such that a second end of the boom raises and lowers relative to the skid. The room is mounted on the skid. The apparatus also includes a raisable apparatus supported by the second end of the boom, the raisable apparatus being or having one or more plug panels for connecting to one or more first cables. The apparatus also includes second cables routed from the raisable apparatus and attached to and supported at least in part by the boom. The second cables provide electrical power to the raisable apparatus and are different from the first cables.

The present disclosure also introduces an apparatus including a rig floor structure, a substructure, and a local electrical room. The substructure supports the rig floor structure and includes a lift operable to raise the rig floor structure above the substructure. The local electrical room module includes a skid, a boom attached to the skid, a room mounted on the skid, a floor attached to the boom and mechanically coupled to the rig floor structure, and a raisable apparatus mounted on the floor. The raisable apparatus includes one or more first plug panels connected to one or more first cables routed from on or above the rig floor structure. Operation of the lift raising the rig floor structure also raises the floor and the raisable apparatus together. Second cables routed from the raisable apparatus are attached to and supported at least in part by the boom. The second cables provide electrical power to the raisable apparatus.

The present disclosure also introduces a method including deploying transportable modules at a well site. The transportable modules include a first side box module, a second side box module, a rig floor module, and a local electrical room module. The first and second side box modules and the rig floor module are mechanically attached during deployment to form a rig floor structure. The local electrical room module includes a room mounted on a skid, a boom attached to the skid, a floor attached to the boom, and a raisable apparatus mounted on the floor and including a plug panel. The method also includes mechanically coupling the floor of the local electrical room module to the rig floor structure, and raising the rig floor structure above the skid by operating a lift of the first and second side box modules, such that the floor and the raisable apparatus are raised together with the rig floor structure.

These and additional aspects of the present disclosure are set forth in the description that follows, and/or may be learned by a person having ordinary skill in the art by reading the material herein and/or practicing the principles described herein. At least some aspects of the present disclosure may be achieved via means recited in the attached claims.

BRIEF DESCRIPTION OF THE DRAWINGS

The present disclosure is understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
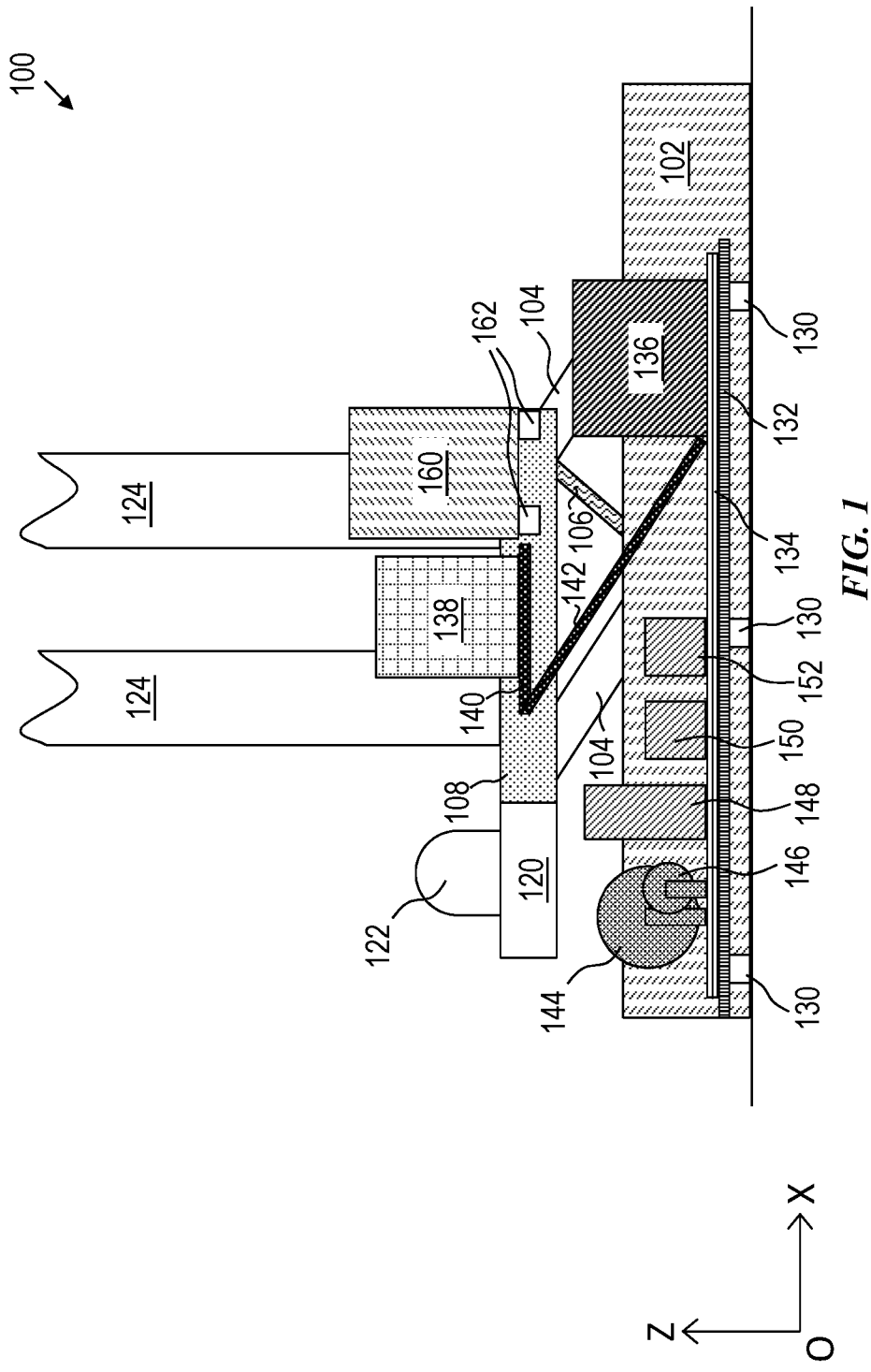
FIG. 1 is a schematic view of at least a portion of an example implementation of apparatus according to one or more aspects of the present disclosure.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for simplicity and clarity, and does not in itself dictate a relationship between the various embodiments and/or configurations discussed. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact.

One or more aspects of the present disclosure are presented in the context of a "room." A person having ordinary skill in the art will appreciate that a "room" may be a cabin or other enclosed volume known in the art for providing ventilated and/or climate-controlled protection of electronics, controls, and other equipment, and permitting ingress and egress by a human operator to physically access such equipment. Examples of such rooms known in the art include a power control room (PCR), a driller control room (DCR), and an LER, among other examples.

Systems and methods and/or processes according to one or more aspects of the present disclosure may be used or performed in connection with well construction operations, such as at a well site for constructing a wellbore to obtain hydrocarbons (e.g., oil and/or gas) from a formation, including drilling the wellbore. For example, some aspects may be described in the context of drilling a wellbore in the oil and gas industry. One or more aspects of the present disclosure may be applied in other contexts, such as for any construction operations.

One or more aspects of the present disclosure may allow for simpler deployment of a well construction apparatus where some components (e.g., electrical components) are located at a ground level, which may provide for some protection of those components. A well construction apparatus can include a local electrical room module. In some examples, the local electrical room module includes a raisable apparatus that can be raised with a rig floor of the well construction apparatus. The raisable apparatus can allow for simpler connections of cables at the rig floor and/or can include some electrical components of a power system. Other components can be at ground level, e.g., mounted on a skid and/or in a lower electrical room mounted on the skid. By being at ground level, a measure of protection can be provided to those components from vibrations and shock during well construction operations. Various examples and modifications are described herein, and a person of ordinary skill in the art will readily understand other modifications that can be made to those examples and modifications, which are within the scope of the present disclosure.

Figure 2:
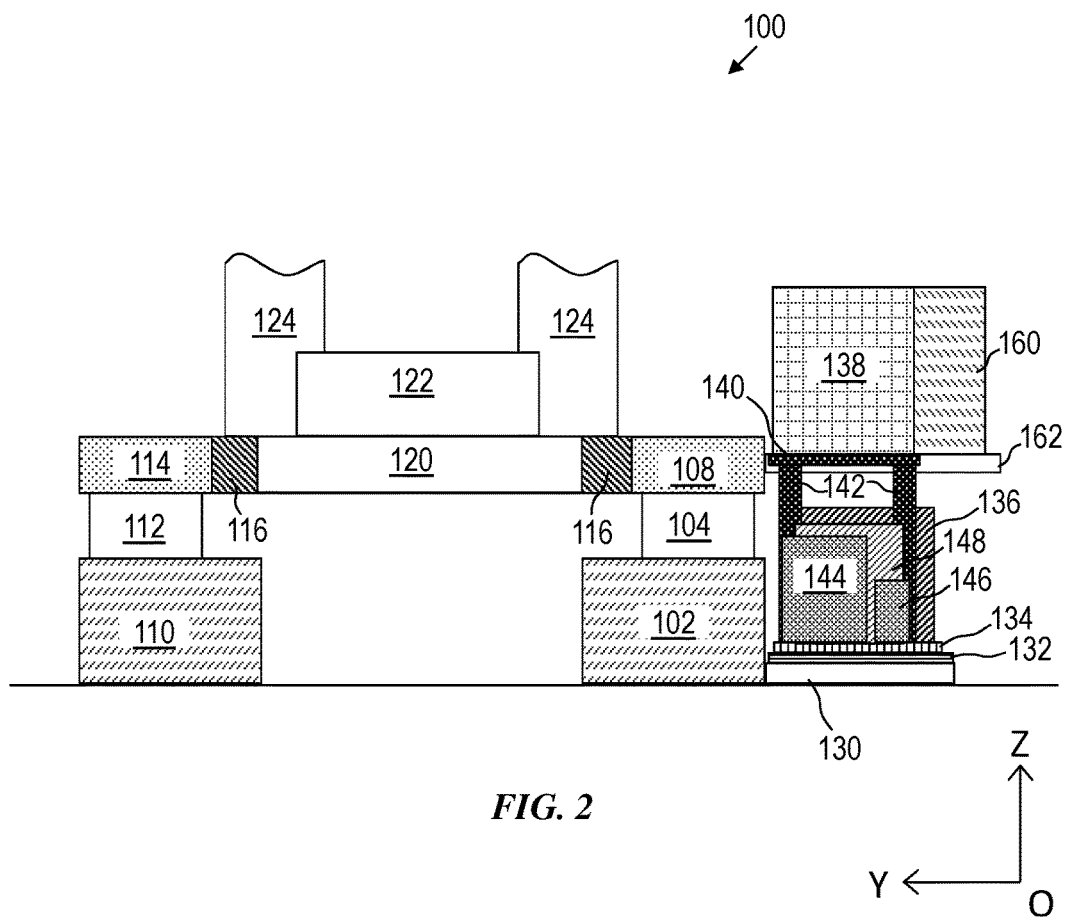
FIG. 2 is a schematic view of at least a portion of an example implementation of apparatus according to one or more aspects of the present disclosure.
Figure 3:
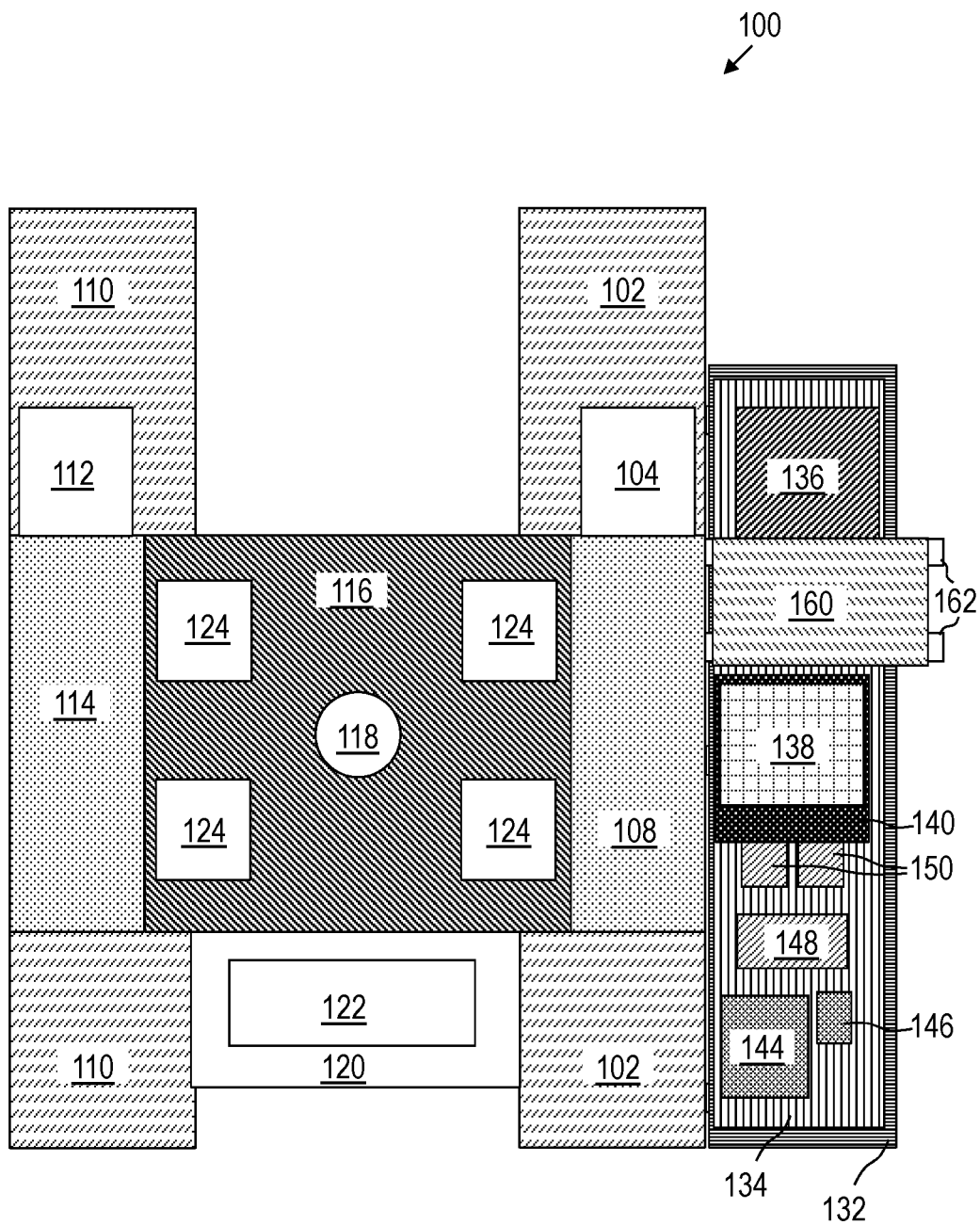
FIG. 3 is a schematic view of at least a portion of an example implementation of apparatus according to one or more aspects of the present disclosure.
Figure 3:
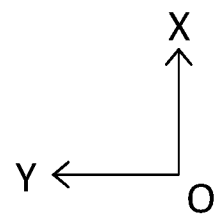

FIGS. 1-3 are respective schematic views of at least a portion of a simplified, example implementation of a well construction apparatus 100 according to one or more aspects of the present disclosure. FIGS. 1-3 illustrate different schematic views of the well construction apparatus 100 and will be described together. Each of these figures includes an approximate orientation point O with X-Y-Z coordinate axes to facilitate orienting the different views.

The well construction apparatus 100 in this example may be deployed to a well site as separate modules, each of which may be transported to the well site by a separate vehicle (e.g., a truck and trailer). The various modules may be arranged at the well site and mechanically attached together as appropriate. Various ones of example modules are described below with respect to the well construction apparatus 100, and other implementations may have fewer, additional, and/or different modules.

The well construction apparatus 100 includes two side box modules, a center (or rig floor) module, a drawworks module, a mast module, a driller control room module, and a local electrical room module. In the deployment of these modules at the well site (e.g., rig up), the side box modules are arranged in parallel at the well site. A first side box module includes a first footing structure 102, first moveable support structures 104, a hydraulic lift 106, and a first rig floor frame 108. A second side box module includes a second footing structure 110, second moveable support structures 112, a hydraulic lift (not specifically illustrated), and a second rig floor frame 114. The first and second side box modules together form at least a portion of a substructure of the well construction apparatus 100. As will become apparent from subsequent description, the first and second side box modules include a hydraulics system (e.g., including the hydraulic lift 106) that raises a rig floor of the well construction apparatus 100. When the hydraulics system is operated, the first moveable support structures 104 and the second moveable support structures 112 can rotate around respective hinge points in the first footing structure 102 and first rig floor frame 108, and in the second footing structure 110 and second rig floor frame 114 to expand the first and second side box modules and raise the rig floor of the well construction apparatus 100.

With the first and second side box modules deployed in parallel at the well site, the center module is deployed between the first and second side box modules. The center module is attached to the first rig floor frame 108 and the second rig floor frame 114. The center module includes a rig floor frame that further forms at least a portion of the substructure of the well construction apparatus 100 and includes a rig floor 116. The first rig floor frame 108, the second rig floor frame 114, and the rig floor 116 form a rig floor structure. Additionally, an opening 118 is through the rig floor 116. During some operations of the well construction apparatus 100 such as drilling, a drillstring may extend through the opening 118 to a formation in the underlying earth.

The drawworks module is deployed attached to the center module and/or the first and second side box modules. The drawworks module includes a drawworks skid 120 that is attached to the center module (e.g., the rig floor 116 and/or rig floor frame) and/or to the first rig floor frame 108 and second rig floor frame 114. A drawworks 122 used for, among other things, raising and lowering a drillstring during drilling operations, is mounted on the drawworks skid 120.

The mast module is deployed on the rig floor 116. In this example, the mast module includes a mast 124 (a portion of which is shown in the figures), which may be telescopic. From a vehicle on which the mast module is transported, the mast module is attached to the rig floor 116 at one or more anchor points and is rotated around the anchor point(s) to an upright position. A hydraulics system may be used to rotate the mast 124 into the upright position. The mast 124 may then be telescopically extended to a mast height. A crown block may be at and supported by an upper portion of the mast 124.

The mast module further includes a top drive (not illustrated) with associated rotary motor, gear box or transmission, drive shaft, and swivel. A hook and traveling block may be mechanically coupled to the top drive. The top drive may have a rail guide system on the mast 124 that guides the top drive along vertical movement during drilling operations and prevents the top drive from rotating as a result of torque that the top drive applies to a drillstring during drilling operations. The top drive may be secured in the mast 124 during transport and rig up until the top drive is supported by a drill line as described below.

The local electrical room module is deployed adjacent the first side box module. The first footing structure 102 of the first side box module includes support beams 130 that support the local electrical room module during deployment of the local electrical room module. The support beams 130 may be hinged at the first footing structure 102. During transport of the first side box module, the support beams 130 may be folded, by operation of the hinge, to the first footing structure 102. In preparation of deployment and during deployment of the local electrical room module, the support beams 130 may be unfolded to extend perpendicularly, for example, from the first footing structure 102 and may support the local electrical room module. In some examples, the first footing structure 102 and second footing structure 110 include hydraulically controlled feet that allow the well construction apparatus 100 to reposition itself, e.g., "walk." In those examples, by having the support beams 130 extending from the first footing structure 102 and supporting the local electrical room module, the well construction apparatus 100 may be repositioned (e.g., by walking) without having to separately reposition the local electrical room module.

A skid support 132 may be used to further support the local electrical room module. The skid support 132 can be a rigid frame, for example, separate from the local electrical room module. The skid support 132 can be placed on the support beams 130 prior to skidding of the local electrical room module. The skid support 132 can facilitate skidding the local electrical room module on the support beams 130.

The local electrical room module includes a skid 134 that supports various other components of the local electrical room module. The skid 134 and the components mounted thereon can be unloaded from a vehicle (e.g., a trailer) by a pulley system that forces the skid 134 from the vehicle and onto the skid support 132, where the skid 134 is then slid into position on the skid support 132.

A lower electrical room 136 is mounted on the skid 134. The lower electrical room 136 can include various electrical components, such as for control (e.g., via programmable logic controllers (PLCs)), communication, and/or others. Some components that can be included in some examples are described in further detail below.

A raisable apparatus 138 is mounted on a horizontal floor 140, which is attached to and supported by a boom 142. The raisable apparatus 138 can be or comprise various components, and some examples are described below. The horizontal floor 140 is attached to the boom 142 by a joint, hinge, or the like, for example, at one end of the boom 142. The boom 142 is attached to and supported by the skid 134 by a joint, hinge, or the like, for example, at the other end of the boom 142, which may allow for rotation of the boom 142 around the joint, hinge or the like. During transport, the horizontal floor 140 and boom 142 are collapsed or folded (e.g., in a "Z" configuration with the skid 134). In some examples, various mechanisms may be present to prevent the horizontal floor 140 and boom 142 from collapsing or folding fully to the skid 134, such as blocks, stops, pins, and/or other example mechanisms. Hence, in some examples, the boom 142 is rigid enough to support the horizontal floor 140 and raisable apparatus 138, e.g., during transport. In some examples, the horizontal floor 140 and boom 142 may collapse or fold fully to the skid 134.

At deployment, the horizontal floor 140 can be mechanically coupled to the first rig floor frame 108, for example. In some examples, the horizontal floor 140 is mechanically coupled to the first rig floor frame 108 via a rigid link and pins, such as described in further detail below. In other examples, the horizontal floor 140 can be directly and/or indirectly mechanically coupled to the first rig floor frame 108 via other mechanisms. During deployment, by mechanically coupling the horizontal floor 140 to the first rig floor frame 108, the first rig floor frame 108, e.g., and with the boom 142, can support the horizontal floor 140 and the raisable apparatus 138.

Other components are mounted on and supported by the skid 134. The components can vary in different implementations. In the illustrated example, a power cable spool 144 is mounted on the skid 134. The power cable spool 144 can reel in and release power cable, which may be from a generator or set of generators and/or a power control room. The power cable may also be a thick gauge cable, in some examples. A communication cable spool 146 is also mounted on the skid 134. The communication cable spool 146 can wind and unwind communication cable, which may be from a control room. The communication cable may include and/or be a fiber optic cable, a thin gauge cable, or other example cables, in some examples. One or more transformers 148 and one or more brake resistors 150 (e.g., two brake resistors 150) are mounted on the skid 134. Multiple physical resistors may be electrically coupled in parallel and/or serially to form a brake resistor. Additional details of the transformers 148 and brake resistors 150 are described below. One or more radiators 152 are also mounted on the skid 134. The radiators 152 can be used to cool various components of the local electrical room module, such as by pumping a cooling fluid through closed-loop conduits to the lower electrical room 136 and/or the raisable apparatus 138, for example. In some examples, air cooling may be used to remove heat from the various components, such as by using heat spreaders (e.g., with a heat sink that may include high heat conductance fins), and radiators may be omitted or used in addition to the air cooling in those examples.

The driller control room module is deployed adjacent the first side box module. The first rig floor frame 108 of the first side box module includes support beams 162 that support the driller control room module, e.g., a driller control room 160, during deployment of the driller control room module. The support beams 162 may be hinged at the first rig floor frame 108. During transport of the first side box module, the support beams 162 may be folded, by operation of the hinge, to the first rig floor frame 108. In preparation of deployment and during deployment of the driller control room module, the support beams 162 may be unfolded to extend perpendicularly, for example, from the first rig floor frame 108 and may support the driller control room module. The driller control room 160 may be deployed by, for example, a forklift, crane, or other example equipment capable of lifting and placing the driller control room 160 on the support beams 162.

The driller control room module may be deployed before or after deployment of the local electrical room module. The raisable apparatus 138 of the local electrical room module may be proximate the driller control room 160 when the local electrical room module and the driller control room module are deployed.

Figure 4:
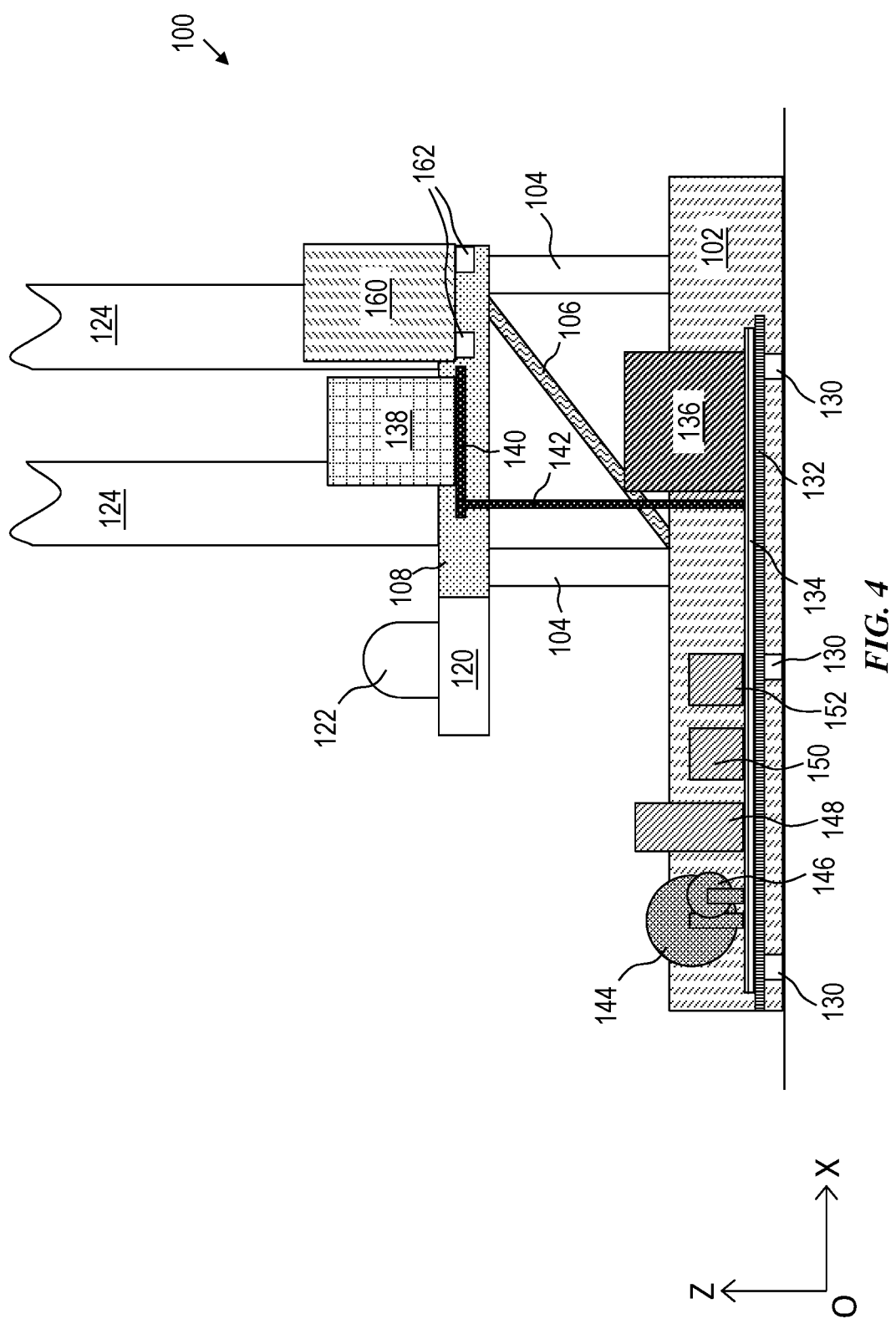
FIG. 4 is a schematic view of at least a portion of an example implementation of apparatus according to one or more aspects of the present disclosure.
Figure 5:
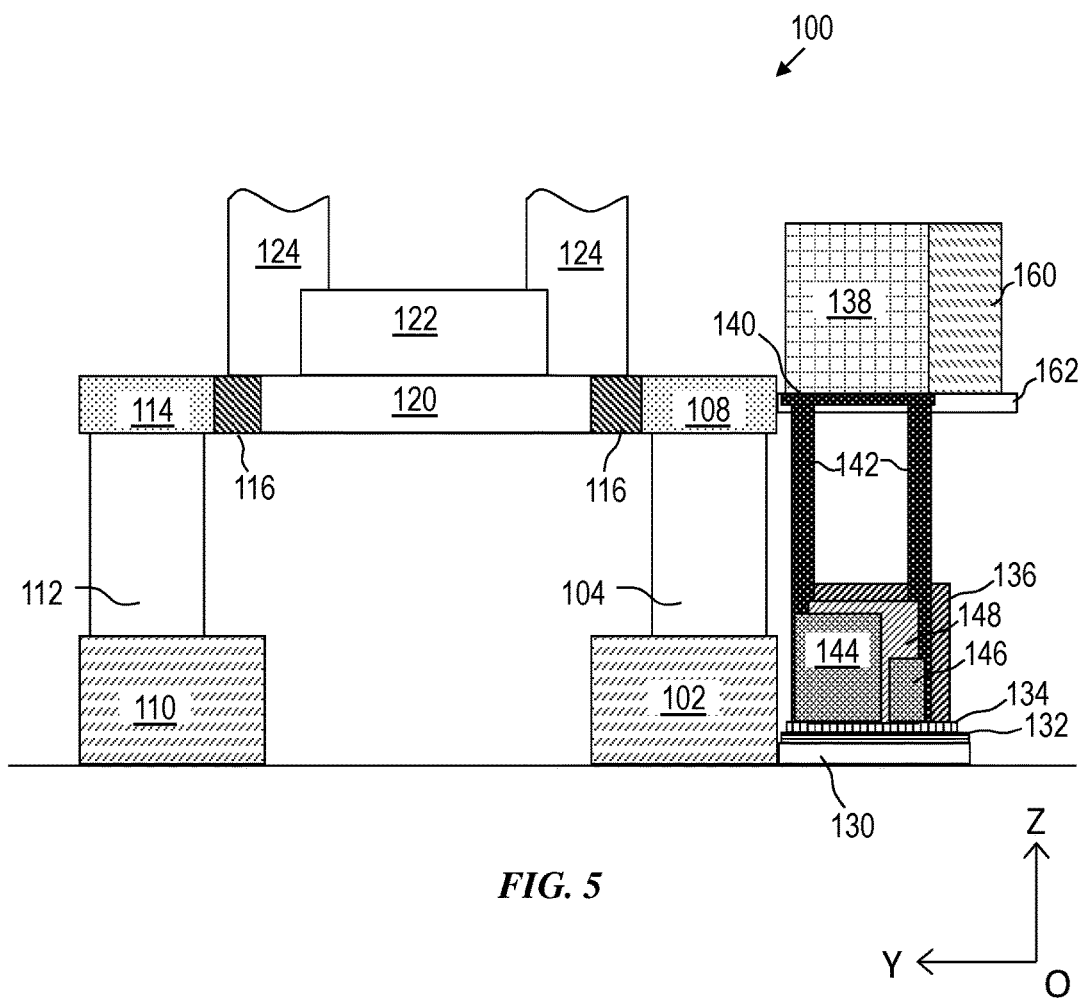
FIG. 5 is a schematic view of at least a portion of an example implementation of apparatus according to one or more aspects of the present disclosure.
Figure 6:
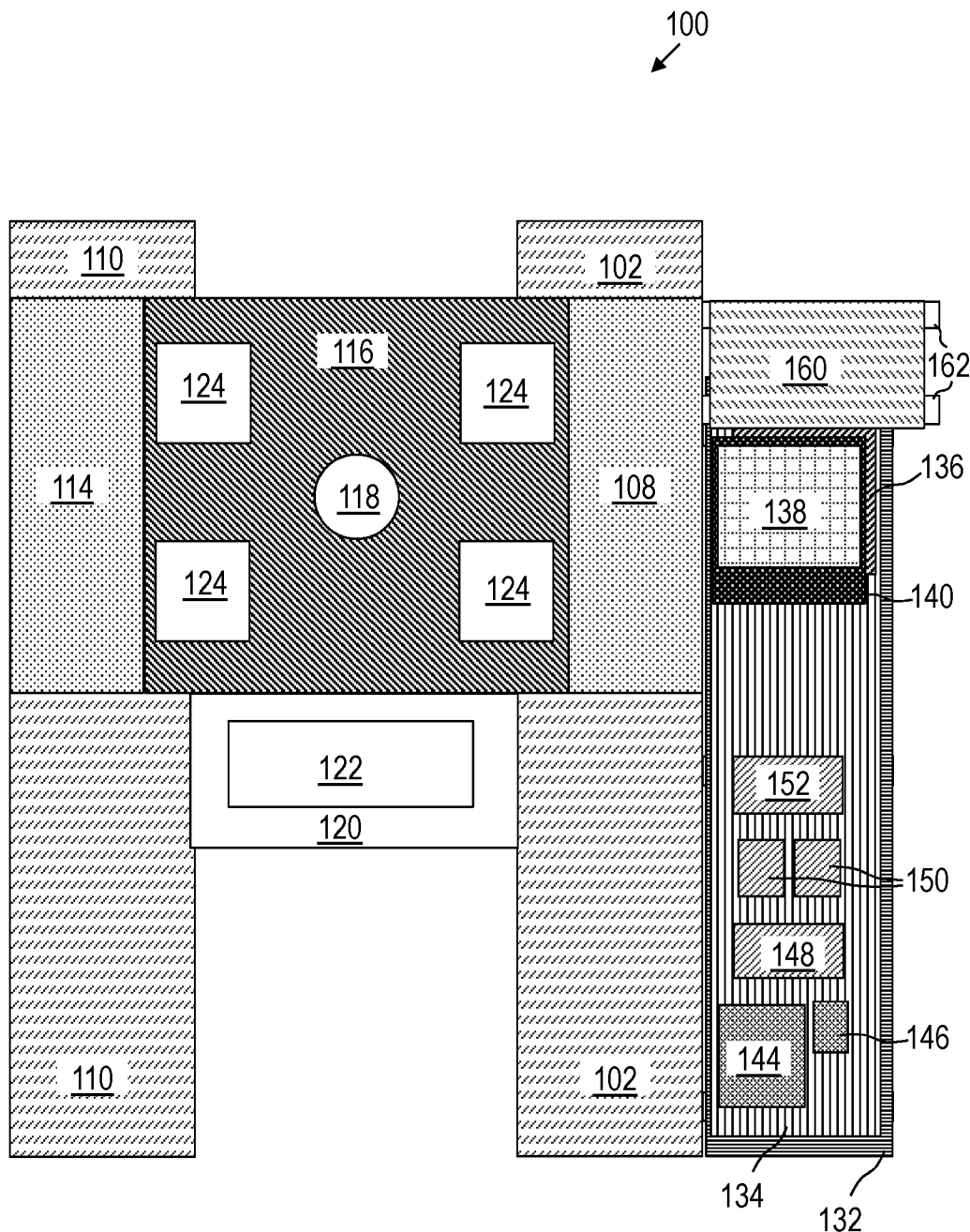
FIG. 6 is a schematic view of at least a portion of an example implementation of apparatus according to one or more aspects of the present disclosure.

FIGS. 4-6 are respective schematic views of at least a portion of a simplified, example implementation of the well construction apparatus 100 according to one or more aspects of the present disclosure. FIGS. 4-6 illustrate different schematic views of the well construction apparatus 100 and will be described together. Each of these figures includes an approximate orientation point O with X-Y-Z coordinate axes to facilitate orienting the different views, which corresponds to the orientation point O in FIGS. 1-3.

In FIGS. 4-6, the rig floor 116, the first rig floor frame 108, and the second rig floor frame 114 (e.g., the rig floor structure) of the well construction apparatus 100 of FIGS. 1-3 are raised to an operational (e.g., drilling) level. The rig floor 116, the first rig floor frame 108, and the second rig floor frame 114, in the illustrated example, are raised via operation of the hydraulics system including the hydraulic lift 106 of the first side box module and the hydraulic lift of the second side box module. The hydraulic lifts can be extended, which cause the first moveable support structures 104 and the second moveable support structures 112 to rotate to an upright, vertical position that, in turn, raises the rig floor 116, the first rig floor frame 108, and the second rig floor frame 114.

With the raising of the first rig floor frame 108, the horizontal floor 140 with the raisable apparatus 138 are also lifted. Since the horizontal floor 140 is mechanically coupled to the first rig floor frame 108, the raising of the first rig floor frame 108 also causes the horizontal floor 140 and raisable apparatus 138 to be raised. Hence, in some examples, no independent lifting mechanism is included in the local electrical room module that would be used to lift the horizontal floor 140. In the illustrated example, the raising of the horizontal floor 140 further causes the boom 142 to rotate to a vertical position between the horizontal floor 140 and the skid 134. In some implementations, the hydraulic lifts of the side box modules may cause the rig floor 116, the first rig floor frame 108, and the second rig floor frame 114 to be raised unevenly. By unevenly raising the rig floor 116, the first rig floor frame 108, and the second rig floor frame 114, a torque, a bending force, and/or a shear force may be applied to the boom 142 since the boom 142 is attached via the horizontal floor 140 that is further mechanically coupled to the first rig floor frame 108. Hence, in some examples, the boom 142 may be sufficiently rigid to support the horizontal floor 140 and raisable apparatus 138 while being sufficiently flexible to flex and/or absorb torque and/or shear force without a mechanical failure (e.g., breaking). Even further, the driller control room 160 is raised by the raising of the first rig floor frame 108 since the support beams 162 are included with the first rig floor frame 108. In another implementation, the horizontal floor 140 may be attached to the first rig floor frame 108 such that the horizontal floor 140 follows the movement of the first rig floor frame 108. In such implementation, the boom 142 may be equipped with an additional hinge at its top connection to the horizontal floor 140 to decouple sideways angular movement, permitting the horizontal floor 140 to be less than fully horizontal while minimizing the sideways angular movement (i.e., bending) of the boom 142. The boom 142 may also comprise or be supported by telescoping or otherwise raisable legs such that the boom 142 can adapt to changing distances between different rig and/or LER systems.

With the rig floor 116, the first rig floor frame 108, and the second rig floor frame 114 raised and the mast 124 extended, a drill line can be reeved from a deadline anchor on the rig floor 116 through sheaves of a traveling block mechanically coupled to the top drive and sheaves of a crown block on the mast 124 to the drawworks 122. By releasing out and reeling in the drill line at the drawworks 122, the top drive can be lowered and raised, respectively, along the mast 124 during drilling operations. The top drive can be operated using a power system, such as described below.

Additional modules and components may be incorporated into the well construction apparatus 100. For example, a catwalk module, including a powered catwalk and tubular racks, and a pipe handling manipulator module can be included in the well construction apparatus 100. Further, a drilling fluid circulation system module including, for example, a shale shaker, a desander, a desilter, a degasser, a hopper and/or one or more drilling fluid tanks may be included in the well construction apparatus 100 and/or separate from the well construction apparatus 100 at the well site. Even further some components may be implemented at the well site separate from the well construction apparatus 100. For example, power generation and control may be at the well site separate from the well construction apparatus 100. The power generation may include one or more generators operable to provide electrical power. A PCR may control the operation of the power generation and, e.g., provide a protective apparatus in the case of a fault.

Figure 7:
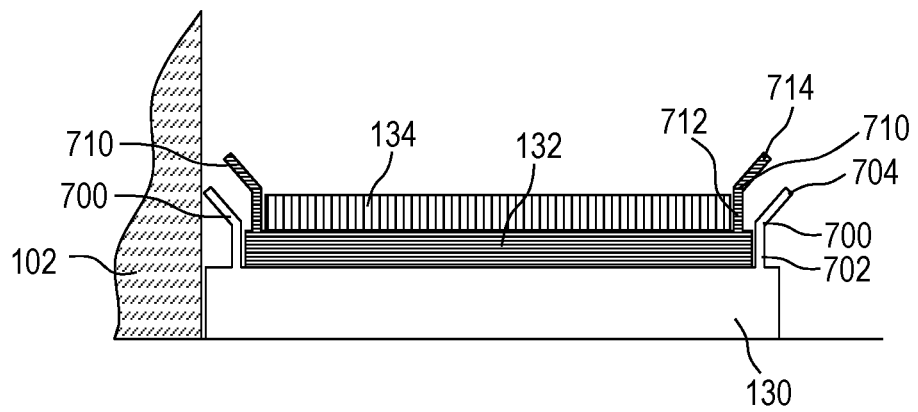
FIG. 7 is a schematic view of at least a portion of an example implementation of apparatus according to one or more aspects of the present disclosure.

FIG. 7 is a schematic view of at least a portion of a simplified, example implementation of a well construction apparatus according to one or more aspects of the present disclosure. FIG. 7 illustrates a skid guidance apparatus for, e.g., the local electrical room module of FIGS. 1-6. The support beams 130 include guide rails 700 that each have a vertical portion 702 extending from the main portion of the support beam 130 and a flared portion 704 extending from the vertical portion 702. When the skid support 132 is deployed on the support beams 130, the skid support 132 may, in some instances, first contact one or more of the flared portions 704 of one or more guide rails 700, which then guide the skid support 132 between opposing vertical portions 702 of the guide rails 700 when the skid support 132 is lowered. Similarly, the skid support 132 includes guide rails 710 that each have a vertical portion 712 extending from the main portion of the skid support 132 and a flared portion 714 extending from the vertical portion 712. When the skid 134 is deployed on the skid support 132, the skid 134 may, in some instances, first contact one or more of the flared portions 714 of one or more guide rails 710, which then guide the skid 134 between opposing vertical portions 712 of the guide rails 710 when the skid 134 is lowered.

Figure 8:
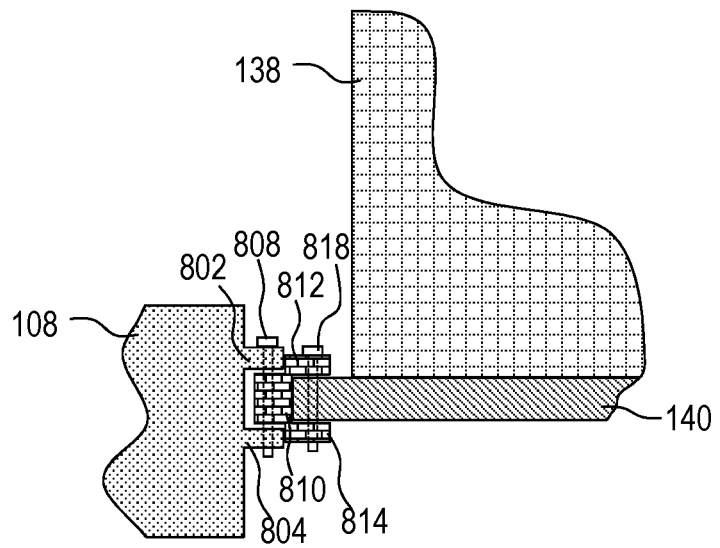
FIG. 8 is a schematic view of at least a portion of an example implementation of apparatus according to one or more aspects of the present disclosure.

FIG. 8 is a schematic view of at least a portion of a simplified, example implementation of a well construction apparatus according to one or more aspects of the present disclosure. FIG. 8 illustrates a linkage system for, e.g., the local electrical room module of FIGS. 1-6. A C-frame is formed integral to the first rig floor frame 108, e.g., a first projection 802 and a second projection 804 extend from the first rig floor frame 108. Each of the first projection 802 and the second projection 804 have a hole through which a pin 808 can slide. A linkage 810 includes an insert and a C-frame. The insert of the linkage 810 is inserted between the first projection 802 and the second projection 804 of the C-frame of the first rig floor frame 108, and the insert of the linkage 810 has a hole through which the pin 808 can slide. Accordingly, the pin 808 is inserted through the first projection 802, the insert of the linkage 810, and the second projection 804 to mechanically attach the linkage to the first rig floor frame 108. The C-frame of the linkage 810 includes a first projection 812 and a second projection 814. Each of the first projection 812 and the second projection 814 have a hole through which a pin 818 can slide. The horizontal floor 140 includes an insert. The insert of the horizontal floor 140 is inserted between the first projection 812 and the second projection 814 of the C-frame of the linkage 810, and the insert of the horizontal floor 140 has a hole through which the pin 818 can slide. Accordingly, the pin 818 is inserted through the first projection 812, the insert of the horizontal floor 140, and the second projection 814 to mechanically attach the linkage to the horizontal floor 140. By mechanically attaching the linkage 810 to the horizontal floor 140 and the first rig floor frame 108, the horizontal floor 140 is mechanically coupled to the first rig floor frame 108. Multiple linkage systems can be used to mechanically couple the horizontal floor 140 to the first rig floor frame 108. Various modifications can be made to the illustrated linkage system in FIG. 8, and different linkage systems can be used to mechanically couple the horizontal floor 140 to the first rig floor frame 108. Such modifications and different linkage systems are within the scope of the present disclosure.

Figure 9:
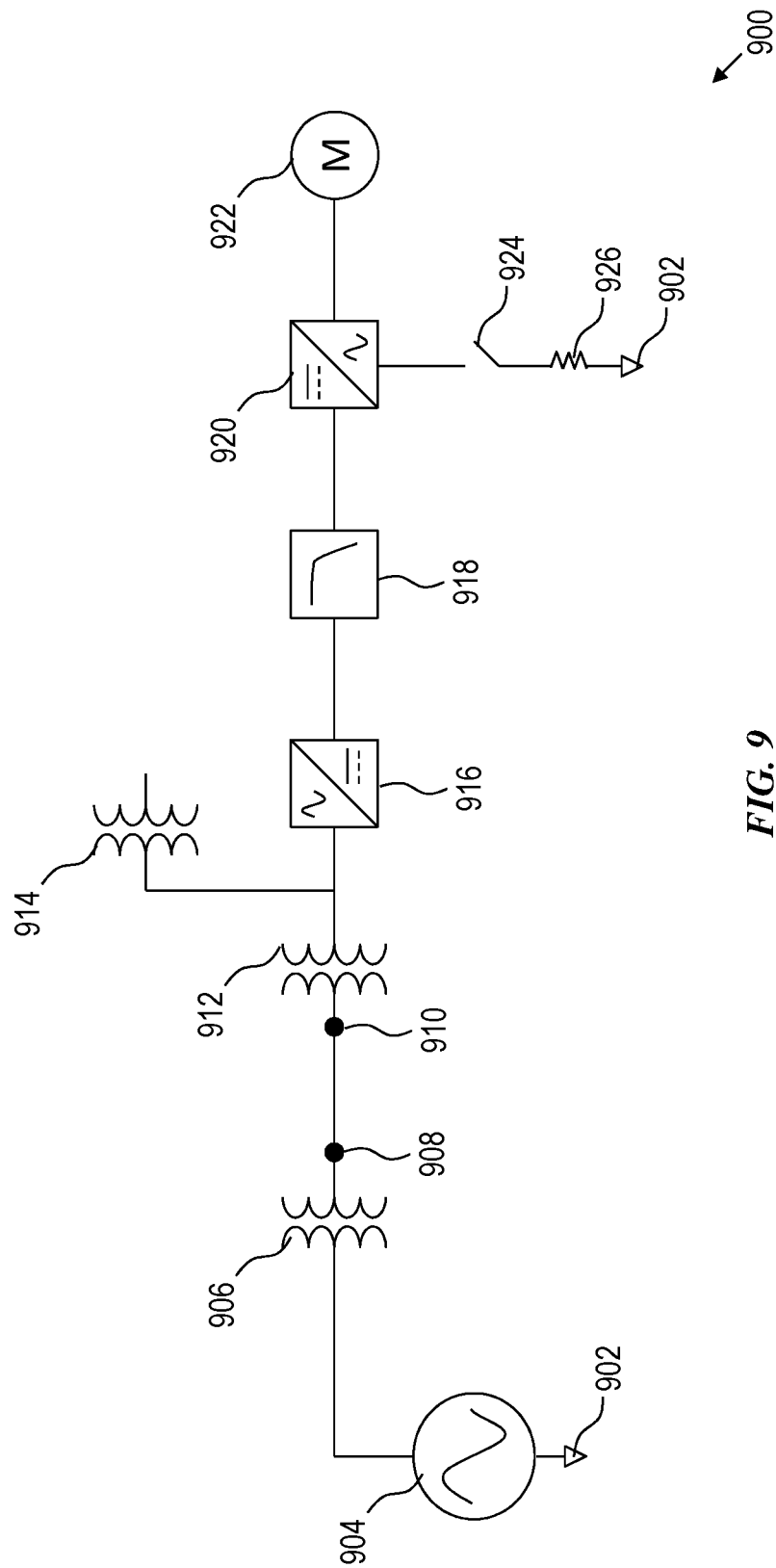
FIG. 9 is a schematic view of at least a portion of an example implementation of apparatus according to one or more aspects of the present disclosure.

FIG. 9 is a schematic view of at least a portion of a simplified, example implementation of a well construction apparatus according to one or more aspects of the present disclosure. FIG. 9 illustrates at least a portion of a one-line schematic of a power system 900 of a well construction apparatus. The power system 900 can include other components that are not illustrated, such as control components like circuit breakers and others. A person of ordinary skill in the art will readily understand the applicability of such components, which are within the scope of the present disclosure.

The power system 900 includes one or more generators 904 that are grounded 902. The generators 904 can include respective prime movers, such as diesel powered engines, that drive alternators to generate an alternating current (AC) electrical charge. In some examples, the generators 904 generate 600 V at 60 Hz. The generators 904 are electrically coupled at a node to a primary winding of a transformer 906. The transformer 906 can be at a power control room at the well site of the well construction apparatus, for example, and hence, the secondary winding of the transformer 906 can be electrically coupled to connection node 908 at the power control room. The transformer 906 can step up a voltage between the primary winding and the secondary winding. In some examples, the transformer 906 steps up the voltage from 600 V to 4160 V, which can result in a voltage of 4160 V at the connection node 908.

The connection node 908 is electrically coupled to connection node 910 at a local electrical room module. Between the connection nodes 908 and 910, a power cable may extend electrically coupling the connection nodes 908 and 910, which may, in some instances at least in part, be wound on a power cable spool (e.g., the power cable spool 144 of FIGS. 1-6).

The connection node 910 is electrically coupled to a primary winding of a transformer 912 on the local electrical room module (e.g., transformer 148 in FIGS. 1-6). The transformer 912 can step down a voltage between the primary winding and the secondary winding. In some examples, the transformer 912 steps down the voltage from 4160 V to 600 V.

The secondary winding of the transformer 912 is electrically coupled to a primary winding of a transformer 914. The transformer 914 can step down a voltage between the primary winding and the secondary winding. The output from the secondary winding of the transformer 914 can be used, e.g., to power various components of the local electrical room module, such as communication devices, PLCs, and/or other example components, which are not specifically illustrated. In some examples, the transformer 912 steps down the voltage from 600 V to 120 V.

The secondary winding of the transformer 912 is also electrically coupled to an input node of a rectifier 916. The rectifier 916 changes the AC power to direct current (DC) power. A person of ordinary skill in the art will readily understand different configurations useable for the rectifier 916, which are within the scope of the present disclosure. In some examples, the rectifier 916 changes the power from 600 VAC to 800 VDC at an output node of the rectifier 916.

The output node of the rectifier 916 is electrically coupled to an input node of a filter 918, such as a low pass filter. By passing the output of the rectifier 916 through the filter 918, any ripples and/or noise in the power signal can be reduced and/or removed. Hence, the output of the filter 918 can be a DC power signal with reduced ripples and/or noise compared to the output of the rectifier 916.

The output node of the filter 918 is electrically coupled to an input node of an inverter 920. The inverter 920 changes the DC power to AC power. The inverter 920 allows for controlling and varying a frequency of the output AC power. A person of ordinary skill in the art will readily understand different configurations useable for the inverter 920, which are within the scope of the present disclosure.

The output node of the inverter 920 is electrically coupled to a top drive motor 922. The top drive motor 922, in this example, is an asynchronous induction motor (e.g., a three-phase squirrel-cage motor) that operates with a torque and speed, e.g., for rotating a drillstring, that is controllable by the frequency of the power, e.g., the output of the inverter 920. A person of ordinary skill in the art will readily understand VFD principles for controlling the top drive motor 922, which are within the scope of the present disclosure.

A chopper 924 and brake resistor 926 (e.g., brake resistors 150 in FIGS. 1-6) are serially electrically coupled between the inverter 920 and ground 902. Under some operating conditions, the top drive motor 922 may generate rather than consume power, such as when the top drive motor 922 begins to freely rotate at too great of a speed. In such situations, the chopper 924 is controlled to close and open, such as by a PLC and based on a pulse width modulated signal, to divert power to the brake resistor 926, which dissipates the power.

Although discussed singularly, various components described in the power system 900 may comprise multiple components in parallel (e.g., two inverters 920 electrically coupled together in parallel) or combinations of multiple components in parallel. A person of ordinary skill the art will readily understand such a modification, which is within the scope of the present disclosure.

An instance of the power system 900, including one or more of the rectifier 916, the filter 918, the inverter 920, the induction motor 922, the chopper 924, and the brake resistor 926, can be utilized in association with the drawworks module. For example, a rectifier, a filter, an inverter, a chopper, a brake resistor, and an induction motor of the drawworks can be electrically coupled the same or similar manner as the respective components in FIG. 9 from the transformer 912 for the motor of the top drive or the drawworks. A person of ordinary skill in the art will readily understand the applicability of such components, which are within the scope of the present disclosure.

Figure 10:
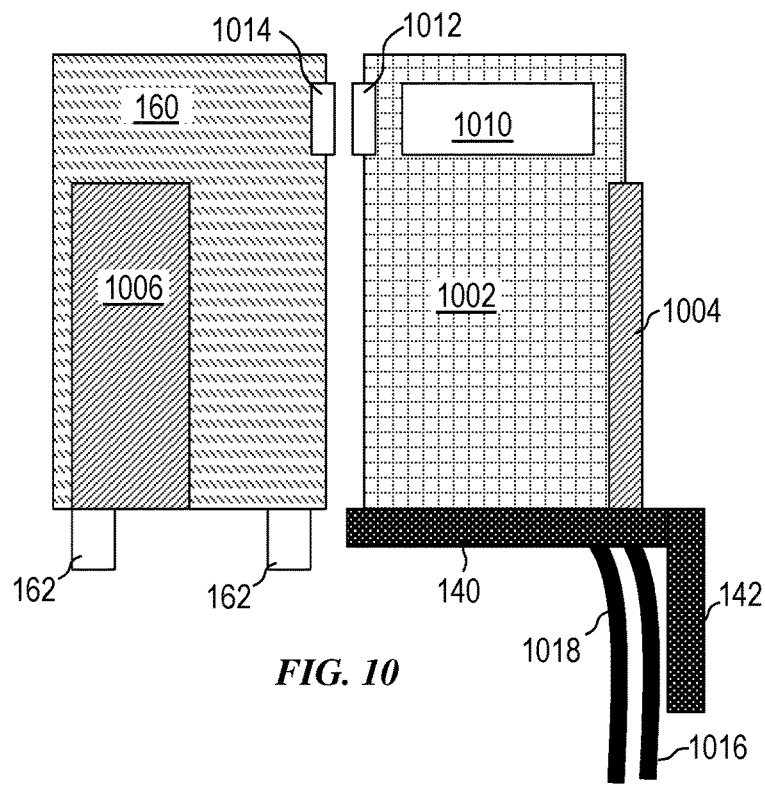
FIG. 10 is a schematic view of at least a portion of an example implementation of apparatus according to one or more aspects of the present disclosure.

FIG. 10 is a schematic view of at least a portion of a simplified, example implementation of a well construction apparatus according to one or more aspects of the present disclosure. FIG. 10 illustrates a first example of a raisable apparatus (e.g., the raisable apparatus 138 of FIGS. 1-6) and the driller control room 160. The raisable apparatus in FIG. 10 may include one or more plug panels 1010 operable to facilitate power distribution and control at the rig floor. In an implementation, the raisable apparatus may include a raisable container 1002 on the horizontal floor 140, wherein the raisable container 1002 may be a panel or a room. When implemented as a room, the raisable room 1002 may include a door 1004 for ingress and egress of personnel. The door 1004 is illustrated on a side of the raisable room 1002 opposite from the driller control room 160, although in other examples, the door 1004 may be at other locations on the raisable room 1002. Further, although not necessarily specifically illustrated, the horizontal floor 140 may include sufficient clearance for a walkway between the door 1004 and the rig floor structure with appropriate safety measures, such as a guardrail. Similarly, the driller control room 160 includes a door 1006 on a side of the driller control room 160 proximate to and facing the rig floor structure, which also may be at other locations on the driller control room 160.

The raisable room 1002 includes a first plug panel 1010 and a second plug panel 1012. The first plug panel 1010 is on an exterior side of the raisable container 1002 facing the rig floor. Cables that extend onto and/or above the rig floor can be connected to the first plug panel 1010 to thereby connect those cables to appropriate systems. For example, the power cables for the top drive motor and/or drawworks motor can be connected to the first plug panel 1010. The cables connected to the first plug panel 1010 can include power cables, communication cables, control cables, and/or other types of cables. In an implementation, the first plug panel 1010 may be separated into two or more sub-plug-panels each dedicated to corresponding rig equipment (e.g., a sub-plug-panel for the drawworks and another sub-plug-panel for the top-drive). The second plug panel 1012 may be located on an exterior side of the raisable container 1002 facing the driller control room 160. Cables that are to be electrically coupled to components in the driller control room 160 may be connected to the second plug panel 1012. For example, communication and control cables that are to be communicatively coupled to components in the driller control room 160 may be connected to the second plug panel 1012. Additionally, power cables (such as cables providing 120 VAC power) can be connected to the second plug panel 1012. Further, the driller control room 160 has a third plug panel 1014, and cables may be connected between the second plug panel 1012 and the third plug panel 1014. By utilizing plug panels on the raisable container 1002 and the driller control room 160, connections exterior to those rooms may be made more easily during deployment (e.g., rig up).

Cables 1016 also extend from the raisable system, which may include the raisable container 1002, to the lower electrical room (e.g., lower electrical room 136) and/or other components of the local electrical room module. The cables 1016 can be routed through a wall of the raisable container 1002 (e.g., a wall opposite from the rig floor), which may be through an opening through the wall and/or another plug panel. Since the cables 1016 in some circumstances may not be regularly repeatedly connected and disconnected during deployment, a plug panel may be omitted to connect the cables 1016. The cables 1016 can include power cables, communication cables, control cables, and/or other cables that are routed from the local electrical room module to the rig floor and/or driller control room 160. The cables 1016 may further be attached to and/or supported by, at least in part, the boom 142. The boom 142 may therefore support at least some of the weight of the cables 1016 when the cables 1016 are raised during deployment.

Additionally, conduit 1018 (e.g., flexible conduit) also extends from the raisable container 1002 to one or more components of the local electrical room module. For example, in some examples, the conduit 1018 is used to convey a fluid from a radiator (e.g., radiator 152 of FIGS. 1-6) of the local electrical room module to cool components in the raisable container 1002. The conduit 1018 may further be attached to and/or supported by, at least in part, the boom 142. The boom 142 may therefore support at least some of the weight of the conduit 1018 when the conduit 1018 is raised during deployment. In some implementations, the conduit 1018 may be omitted, such as when air cooling is used to cool components and/or insure that internal pressure within the raisable container 1002 is maintained at safe levels. In another implementation, one or more of the conduit 1018 (e.g., a pair of conduits 1018) may be used to circulate a cooling fluid from the LER 136 to the raisable container 1002.

In this first example, the well construction apparatus includes the power system 900 of FIG. 9. The local electrical room module includes the following equipment at the identified locations. The rectifier 916, filter 918, and chopper 924 are in the lower electrical room (e.g., lower electrical room 136 of FIGS. 1-6), which may be considered to be at ground level. Other components, such as controller for motors, can also be in the lower electrical room. The brake resistor 926 (e.g., brake resistors 150 in FIGS. 1-6 electrically coupled in parallel) and transformers 912 and 914 (e.g., the one or more transformers 148 in FIGS. 1-6) are mounted on the skid (e.g., skid 134 in FIGS. 1-6), which may also be considered to be at ground level. The inverter 920 is in the raisable room 1002. The cables 1016 electrically couple the inverter 920 to, e.g., the filter 918 and chopper 924 in the lower electrical room. Cables can be connected to the first plug panel 1010 from the inverter 920 in the raisable room 1002, and other cables can be connected to the first plug panel 1010 from motors on the rig floor, such as the top drive motor and/or the drawworks motor, to provide power from the respective inverter 920. Various other cables can be routed within the local electrical room module to implement other aspects of the power system 900 of FIG. 9. In this example, the conduit 1018 can convey fluid from a radiator on the skid to the raisable room 1002 to cool the inverter 920. By placing the inverter 920 in the raisable room 1002 in this example, the length of cables carrying AC power to the top drive motor, for example, can be made short to reduce harmonics created by the length of the cables, which in some circumstances can be harmful to the top drive motor. In another implementation, inverter(s) for a drawworks motor may be installed in a container located adjacent to or on top of the drawworks, while inverter(s) for the top-drive may be located inside the raisable room 1002.

Figure 11:
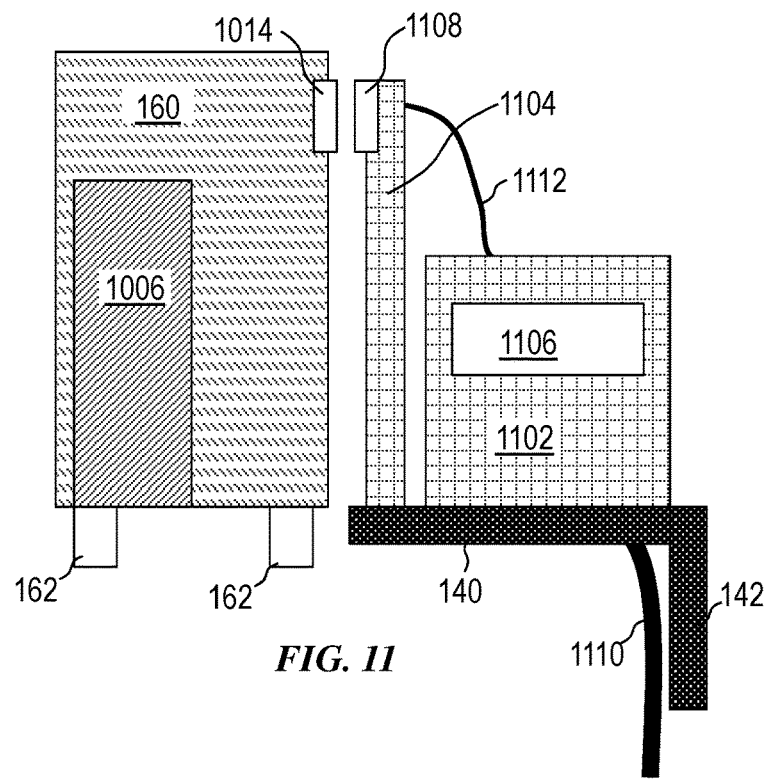
FIG. 11 is a schematic view of at least a portion of an example implementation of apparatus according to one or more aspects of the present disclosure.

FIG. 11 is a schematic view of at least a portion of a simplified, example implementation of a well construction apparatus according to one or more aspects of the present disclosure. FIG. 11 illustrates a second example of a raisable apparatus (e.g., the raisable apparatus 138 of FIGS. 1-6) and the driller control room 160. The raisable apparatus in FIG. 11 includes a first support structure 1102 and a second support structure 1104, each of which may comprise or be a wall, a frame, or another structure, on the horizontal floor 140. The first support structure 1102 is proximate to the rig floor and includes a first plug panel 1106. The second support structure 1104 is proximate the driller control room 160 and includes a second plug panel 1108.

Cables that extend onto and/or above the rig floor can be connected to the first plug panel 1106 to thereby connect those cables to appropriate systems. For example, the power cables for the top drive motor and/or drawworks can be connected to the first plug panel 1106. The cables connected to the first plug panel 1106 can include power cables, communication cables, control cables, and/or other types of cables. Cables that are to be electrically coupled to components in the driller control room 160 may be connected to the second plug panel 1108. For example, communication and control cables that are to be communicatively coupled to components in the driller control room 160 may be connected to the second plug panel 1108. Additionally, power cables (such as cables providing 120 VAC power) can be connected to the second plug panel 1108. Further, cables may be connected between the second plug panel 1108 and the third plug panel 1014. By utilizing plug panels, connections exterior to the local electrical room module may be made more easily during deployment (e.g., rig up).

Cables 1110 and 1112 also extend from the lower electrical room (e.g., lower electrical room 136) and/or other components of the local electrical room module to the first plug panel 1106 and/or the second plug panel 1108. The cables 1110 and 1112 can include power cables, communication cables, control cables, and/or other cables that are routed from the local electrical room module to the rig floor and/or driller control room 160. The cables 1110 and 1112 may further be attached to and/or supported by, at least in part, the boom 142. The boom 142 may therefore support at least some of the weight of the cables 1110 and 1112 when the cables 1110 and 1112 are raised during deployment.

In this second example, the well construction apparatus includes the power system 900 of FIG. 9. The local electrical room module includes the following equipment at the identified locations. The rectifier 916, filter 918, inverter 920, and chopper 924 are in the lower electrical room (e.g., lower electrical room 136 of FIGS. 1-6), which may be considered to be at ground level. Other components, such as a controller for motors, can also be in the lower electrical room. The brake resistor 926 (e.g., brake resistors 150 in FIGS. 1-6 electrically coupled in parallel) and transformers 912 and 914 (e.g., the one or more transformers 148 in FIGS. 1-6) are mounted on the skid (e.g., skid 134 in FIGS. 1-6), which may also be considered to be at ground level. The cables 1110 electrically couple the inverter 920 to, e.g., the first plug panel 1106, which can then be electrically coupled to a top drive motor and/or a drawworks motor. Various other cables can be routed within the local electrical room module to implement aspects of the power system 900 of FIG. 9 and to the first plug panel 1106 and/or the second plug panel 1108. With the inverter 920 in the lower electrical room, a conduit at the ground level can convey fluid from a radiator on the skid to the lower electrical room to cool the inverter 920. By placing the plug panels as the raisable apparatus, connections to components on the rig floor and/or in the driller control room may be easily made.

Figure 12:
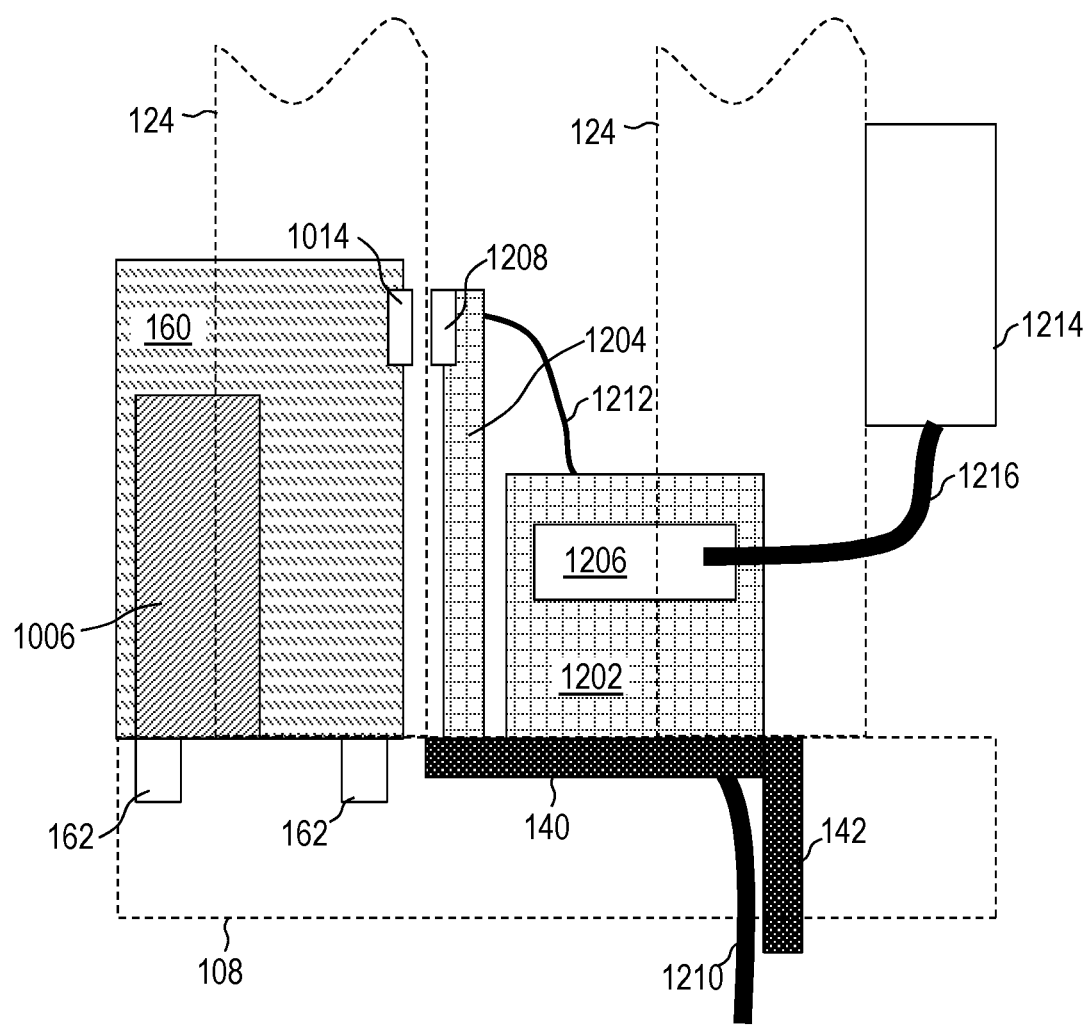
FIG. 12 is a schematic view of at least a portion of an example implementation of apparatus according to one or more aspects of the present disclosure.

FIG. 12 is a schematic view of at least a portion of a simplified, example implementation of a well construction apparatus according to one or more aspects of the present disclosure. FIG. 12 illustrates a third example of a raisable apparatus (e.g., the raisable apparatus 138 of FIGS. 1-6) and the driller control room 160. The raisable apparatus in FIG. 12 includes a first support structure 1202 and a second support structure 1204, each of which may comprise or be a wall, a frame, or another structure, on the horizontal floor 140. The first support structure 1202 is proximate to the rig floor structure and includes a first plug panel 1206. The second support structure 1204 is proximate the driller control room 160 and includes a second plug panel 1208.

Further, in this example, a housing 1214 is mounted on the mast 124 (a portion of which is shown in phantom in FIG. 12). The housing 1214 can contain components, such as described below. Cables 1216 are connected to the first plug panel 1206 and are routed to the housing 1214. Other cables can extend from the housing 1214 to the top drive motor and/or the drawworks, for example.

Other cables that extend onto and/or above the rig floor can be connected to the first plug panel 1206 to thereby connect those cables to appropriate systems. The cables connected to the first plug panel 1206 can include power cables, communication cables, control cables, and/or other types of cables. Cables that are to be electrically coupled to components in the driller control room 160 may be connected to the second plug panel 1208. For example, communication and control cables that are to be communicatively coupled to components in the driller control room 160 may be connected to the second plug panel 1208. Additionally, power cables (such as cables providing 120 VAC power) can be connected to the second plug panel 1208. Further, cables can be connected between the third plug panel 1014 of the driller control room 160 and the second plug panel 1208.

Cables 1210 and 1212 also extend from the lower electrical room (e.g., lower electrical room 136) and/or other components of the local electrical room module to the first plug panel 1206 and/or the second plug panel 1208. The cables 1210 and 1212 can include power cables, communication cables, control cables, and/or other cables that are routed from the local electrical room module to the rig floor and/or driller control room 160. The cables 1210 and 1212 may further be attached to and/or supported by, at least in part, the boom 142. The boom 142 may therefore support at least some of the weight of the cables 1210 and 1212 when the cables 1210 are raised during deployment.

In this third example, the well construction apparatus includes the power system 900 of FIG. 9. The rectifier 916, filter 918, inverter 920, chopper 924, and brake resistor 926 are in the housing 1214. The transformers 912 and 914 (e.g., the one or more transformers 148 in FIGS. 1-6) are mounted on the skid (e.g., skid 134 in FIGS. 1-6), which may also be considered to be at ground level. Other components, such as controllers for motors, can be in the lower electrical room. The cables 1210 electrically couple the transformer 912 to, e.g., the first plug panel 1206, which can then be electrically coupled to the rectifier 916 in the housing 1214. Various other cables can be routed within the local electrical room module to implement aspects of the power system 900 of FIG. 9 and to the first plug panel 1206 and/or the second plug panel 1208.

In other examples, the rectifier 916, filter 918, inverter 920, chopper 924, and brake resistor 926 may be in a housing on the top drive motor, and another rectifier, filter, inverter, chopper, and brake resistor may be in a housing of the drawworks, for example. In such examples, the housing 1214 may be omitted or included with other components.

As described herein, some components of a local electrical room module may be at ground level. By having components at ground level rather than on the rig floor, vibrations and shock from, e.g., drilling operations can be dampened and/or reduced. Some sources of vibrations and shock include the top drive motor, the drawworks motor, movement of the drillstring (e.g., rotational and/or transverse), and jarring. By moving components to ground level, the components are moved further from the sources of vibrations and shock, which in turn can reduce and/or dampen the vibrations and/or shock at the components. In one or more implementations described above, the raisable container 1202 and raisable floor 140 may be mechanically linked to the rig floor after the installation of the skid 134 on the rig arms 132. Accordingly, when the rig floor is raised, the raisable room 1202 and floor 140 may also be raised by the rig floor.

In view of the entirety of the present disclosure, including the figures and the claims, a person having ordinary skill in the art will recognize that the present disclosure introduces an apparatus comprising: a skid; a boom having a first end attached to the skid and pivotable around an axis proximate the first end such that a second end of the boom raises and lowers relative to the skid; a room mounted on the skid; a raisable apparatus supported by the second end of the boom and comprising one or more plug panels configured to connect to one or more first cables; and second cables routed from the raisable apparatus and attached to and supported at least in part by the boom, wherein the second cables are configured to provide electrical power to the raisable apparatus and are different from the first cables.

The raisable apparatus may be connected to the rig floor, so that it is raised with the rig floor.

The apparatus may comprise a transformer mounted on the skid, wherein the second cables may be electrically coupled in a power system between the transformer and the one or more plug panels.

The apparatus may comprise a cable spool mounted on the skid, wherein the cable spool may be configured to reel in and out one or more third cables from and to a power source disposed at a distance away from the skid.

The apparatus may comprise: a radiator mounted on the skid; and conduit routed from the radiator to the room.

The apparatus may comprise a floor attached to the second end of the boom, wherein the raisable apparatus may be mounted on the floor. The floor may include a joint mechanism for mechanically coupling the floor to a rig floor. A rig floor may be operable to raise the floor and the raisable apparatus mounted on the floor.

No lift mechanism may be mounted on the skid or attached to the boom to independently raise and lower the second end of the boom.

The room may be a first room and the raisable apparatus may include a second room, and the one or more plug panels may be disposed on one or more walls of the second room. The apparatus may further comprise: (A) a rectifier disposed in the first room; (B) a filter disposed in the first room, wherein an output node of the rectifier is electrically coupled to an input node of the filter; (C) an inverter disposed in the second room, wherein: (1) an output node of the filter is electrically coupled to an input node of the inverter via one or more of the second cables; and (2) an output node of the inverter is electrically coupled to the one or more plug panels; (D) a chopper disposed in the first room; and (E) a brake resistor mounted on the skid, wherein: (1) the chopper and the brake resistor are serially coupled together; and (2) the serially coupled chopper and brake resistor are electrically coupled to the inverter. In such implementations, among others within the scope of the present disclosure, the apparatus may further comprise: a radiator mounted on the skid and operable for cooling the inverter; and conduit routed to the second room and attached to and supported at least in part by the boom, wherein the conduit is configured to convey a fluid from the radiator to the second room.

The raisable apparatus may include a support structure on which the one or more plug panels are disposed. The apparatus may further comprise: (A) a rectifier disposed in the room; (B) a filter disposed in the room, wherein an output node of the rectifier is electrically coupled to an input node of the filter; (C) an inverter disposed in the room, wherein: (1) an output node of the filter is electrically coupled to an input node of the inverter; and (2) an output node of the inverter is electrically coupled to the one or more plug panels via one or more of the second cables; (D) a chopper disposed in the room; and (E) a brake resistor mounted on the skid, wherein: (1) the chopper and the brake resistor are serially coupled together; and (2) the serially coupled chopper and brake resistor are electrically coupled to the inverter. The apparatus may further comprise a transformer, wherein an output node of the transformer is electrically coupled to the one or more plug panels via one or more of the second cables.

The present disclosure also introduces an apparatus comprising: (A) a rig floor structure; (B) a substructure supporting the rig floor structure and including a lift operable to raise the rig floor structure above the substructure; and (C) a local electrical room module comprising: (1) a skid; (2) a boom attached to the skid; (3) a room mounted on the skid; (4) a floor attached to the boom and mechanically coupled to the rig floor structure; (5) a raisable apparatus mounted on the floor, wherein: (a) the raisable apparatus comprises one or more first plug panels connected to one or more first cables routed from on or above the rig floor structure; and (b) operation of the lift raising the rig floor structure also raises the floor and the raisable apparatus together; and (6) second cables routed from the raisable apparatus and attached to and supported at least in part by the boom, wherein the second cables provide electrical power to the raisable apparatus.

The local electrical room module may not include an independent lift mechanism capable of raising the floor and raisable apparatus.

The substructure may include support beams on which the skid is disposed.

The floor may be mechanically coupled to the rig floor structure via one or more linkages.

The apparatus may comprise: a mast mounted on the rig floor structure; and a top drive operable to vertically traverse the mast and rotate a drillstring, wherein one or more of the first cables may be electrically coupled between the one or more first plug panels and the top drive.

The apparatus may comprise: a drawworks skid attached to the rig floor structure; and a drawworks mounted on the drawworks skid and operable to reel in and out a drill line, wherein one or more of the first cables may be electrically coupled between the one or more first plug panels and the drawworks.

The apparatus may comprise a driller control room, wherein: the rig floor structure includes support beams; the driller control room is disposed on the support beams; and the driller control room includes one or more second plug panels. Third cables may be connected between the one or more second plug panels and the one or more first plug panels.

The local electrical room module may comprise a transformer mounted on the skid, and the second cables may be electrically connected between the transformer and the one or more first plug panels.

The local electrical room module may comprise a cable spool mounted on the skid, and the cable spool may be configured to reel in and out one or more third cables to a power source located a distance away from the local electrical room module.

The local electrical room module may comprise: a radiator mounted on the skid; and conduit routed from the radiator to the room.

The room may be a first room, the raisable apparatus may include a second room, and the one or more first plug panels may be disposed on one or more walls of the second room. The local electrical room module may comprise: (A) a rectifier disposed in the first room; (B) a filter disposed in the first room, wherein an output node of the rectifier is electrically coupled to an input node of the filter; (C) an inverter disposed in the second room, wherein: (1) an output node of the filter is electrically coupled to an input node of the inverter via one or more of the second cables; and (2) an output node of the inverter is electrically coupled to the one or more first plug panels; (D) a chopper disposed in the first room; and (E) a brake resistor mounted on the skid, wherein: (1) the chopper and the brake resistor are serially coupled together; and (2) the serially coupled chopper and brake resistor are electrically coupled to the inverter. The apparatus may comprise: a radiator mounted on the skid; and conduit routed to the second room and attached to and supported at least in part by the boom, wherein the conduit is configured to convey a fluid from the radiator to the second room.

The raisable apparatus may include a support structure on which the one or more first plug panels are disposed. The local electrical room module may comprise: (A) a rectifier disposed in the room; (B) a filter disposed in the room, wherein an output node of the rectifier is electrically coupled to an input node of the filter; (C) an inverter disposed in the room, wherein: (1) an output node of the filter is electrically coupled to an input node of the inverter; and (2) an output node of the inverter is electrically coupled to the one or more first plug panels via one or more of the second cables; (D) a chopper disposed in the room; and (E) a brake resistor mounted on the skid, wherein: (1) the chopper and the brake resistor are serially coupled together; and (2) the serially coupled chopper and brake resistor are electrically coupled to the inverter. The apparatus may comprise a transformer, wherein an output node of the transformer may be electrically coupled to the one or more first plug panels via one or more of the second cables.

The present disclosure also introduces a method comprising: (A) deploying transportable modules at a well site, wherein: (1) the transportable modules include a first side box module, a second side box module, a rig floor module, and a local electrical room module; (2) the first and second side box modules and the rig floor module are mechanically attached during deployment to form a rig floor structure; and (3) the local electrical room module includes: (a) a room mounted on a skid; (b) a boom attached to the skid; (c) a floor attached to the boom; and (d) a raisable apparatus mounted on the floor and including a plug panel; (B) mechanically coupling the floor of the local electrical room module to the rig floor structure; and (C) raising the rig floor structure above the skid by operating a lift of the first and second side box modules, wherein the floor and the raisable apparatus are raised together with the rig floor structure.

After raising the rig floor structure, the skid may be at ground level.

The skid may be deployed on support beams of the first side box module.

The plug panel may be a first plug panel, the transportable modules may include a driller control room module, the driller control room module may be deployed on support beams of the rig floor structure, the driller control room module may include a second plug panel, and the method may comprise connecting cables between the first and second plug panels. After raising the rig floor structure, the driller control room module may neighbor the raisable apparatus.

The floor may be mechanically coupled to the rig floor structure via one or more linkages.

Cables may be routed within the local electrical room module from the raisable apparatus along and supported at least in part by the boom.

The transportable modules may include a mast module comprising a mast and a top drive, the mast may be mounted on the rig floor structure after deployment of the mast module, the top drive may be operable to vertically traverse the mast and rotate a drillstring, and one or more cables may be electrically coupled between the plug panel and the top drive.

The transportable modules may include a drawworks module comprising a drawworks skid with a drawworks mounted thereon. The drawworks skid may be attached to the rig floor structure after deployment of the drawworks module. One or more cables are electrically coupled between the plug panel and the drawworks.

The local electrical room module may comprise a transformer mounted on the skid. One or more cables may be electrically connected between the transformer and the plug panel. The one or more cables may be routed along and supported at least in part by the boom.

The local electrical room module may comprise a cable spool mounted on the skid, and deploying the local electrical room module may comprise reeling out cable from the cable spool to a power control room.

The local electrical room module may comprise: a radiator mounted on the skid; and conduit routed from the radiator to the room.

The room may be a first room, the raisable apparatus may include a second room, and the plug panel may be disposed on a wall of the second room. In such implementations, among others within the scope of the present disclosure, the local electrical room module may comprise: (A) a rectifier disposed in the first room; (B) a filter disposed in the first room, wherein an output node of the rectifier is electrically coupled to an input node of the filter; (C) an inverter disposed in the second room, wherein: (1) an output node of the filter is electrically coupled to an input node of the inverter via one or more cables routed along and supported at least in part by the boom; and (2) an output node of the inverter is electrically coupled to the plug panel; (D) a chopper disposed in the first room; and (E) a brake resistor mounted on the skid, wherein: (1) the chopper and the brake resistor are serially coupled together; and (2) the serially coupled chopper and brake resistor are electrically coupled to the inverter. The local electrical room module may comprise: a radiator mounted on the skid; and conduit routed to the second room and attached to and supported at least in part by the boom, wherein the conduit is configured to convey a fluid from the radiator to the second room.

The raisable apparatus may include a support structure on which the plug panel is disposed. In such implementations, among others within the scope of the present disclosure, the room may be a first room, the raisable apparatus may include a second room, and the local electrical room module may comprise: (A) a rectifier disposed in the first room; (B) a filter disposed in the first room, wherein an output node of the rectifier is electrically coupled to an input node of the filter; (C) an inverter disposed in the first room, wherein: (1) an output node of the filter is electrically coupled to an input node of the inverter; and (2) an output node of the inverter is electrically coupled to the plug panel via one or more cables routed along and supported at least in part by the boom; (D) a chopper disposed in the first room; and (E) a brake resistor mounted on the skid, wherein: (1) the chopper and the brake resistor are serially coupled together; and (2) the serially coupled chopper and brake resistor are electrically coupled to the inverter.

In implementations in which the raisable apparatus includes a support structure on which the plug panel is disposed: (A) the transportable modules may include a mast module comprising a mast and a top drive; (B) the mast may be mounted on the rig floor structure after deployment of the mast module; (C) the mast module may comprise: (1) a housing mounted on the mast; (2) a rectifier disposed in the housing, wherein the rectifier is electrically coupled to the plug panel via one or more cables; (3) a filter disposed in the housing, wherein an output node of the rectifier is electrically coupled to an input node of the filter; (4) an inverter disposed in the housing, wherein: (a) an output node of the filter is electrically coupled to an input node of the inverter; and (b) an output node of the inverter is electrically coupled to the top drive; (5) a chopper disposed in the housing; and (6) a brake resistor disposed in the housing, wherein: (a) the chopper and the brake resistor may be serially coupled together; and (b) the serially coupled chopper and brake resistor may be electrically coupled to the inverter.

In at least some implementations described above and/or otherwise within the scope of the present disclosure, the LER skid is supported by a beam extending from the central package sub-structure, such that the LER moves with the central package during rig walking, and the lower part and upper part of the LER stay attached and connected to the rest of the system. This may make the rig walking very efficient. It should be noted that the beam may be mounted on hinges attached to the substructure permitting easy rig movement, perhaps including when they are not disassembled from the substructure.

The foregoing outlines features of several embodiments so that a person having ordinary skill in the art may better understand the aspects of the present disclosure. A person having ordinary skill in the art should appreciate that they may readily use the present disclosure as a basis for designing or modifying other processes and structures for carrying out the same functions and/or achieving the same benefits of the embodiments introduced herein. A person having ordinary skill in the art should also realize that such equivalent constructions do not depart from the spirit and scope of the present disclosure, and that they may make various changes, substitutions and alterations herein without departing from the spirit and scope of the present disclosure.

The Abstract at the end of this disclosure is provided to comply with 37 C.F.R. § 1.72(b) to permit the reader to quickly ascertain the nature of the technical disclosure. It is submitted with the understanding that it will not be used to interpret or limit the scope or meaning of the claims.

What is claimed is:

1. An apparatus comprising:
a rig floor structure;
a substructure supporting the rig floor structure and including a lift operable to raise the rig floor structure above the substructure; and
a local electrical room module comprising:
a skid;
a boom attached to the skid;
a room mounted on the skid;
a floor attached to the boom and mechanically coupled to the rig floor structure;
a raisable apparatus mounted on the floor, wherein:
the raisable apparatus comprises one or more first plug panels connected to one or more first cables routed from on or above the rig floor structure; and
operation of the lift raising the rig floor structure also raises the floor and the raisable apparatus together; and
second cables routed from the raisable apparatus and attached to and supported at least in part by the boom, wherein the second cables provide electrical power to the raisable apparatus.

2. The apparatus of claim 1 wherein the local electrical room module does not include an independent lift mechanism capable of raising the floor and raisable apparatus.

3. The apparatus of claim 1 wherein the substructure includes support beams on which the skid is disposed.

4. The apparatus of claim 1 wherein the floor is mechanically coupled to the rig floor structure via one or more linkages.

5. The apparatus of claim 1 further comprising:
a mast mounted on the rig floor structure; and
a top drive operable to vertically traverse the mast and rotate a drillstring, wherein one or more of the first cables are electrically coupled between the one or more first plug panels and the top drive.

6. The apparatus of claim 1 further comprising:
a drawworks skid attached to the rig floor structure; and
a drawworks mounted on the drawworks skid and operable to reel in and out a drill line, wherein one or more of the first cables are electrically coupled between the one or more first plug panels and the drawworks.

7. The apparatus of claim 1 further comprising a driller control room, wherein:
the rig floor structure includes support beams;
the driller control room is disposed on the support beams; and
the driller control room includes one or more second plug panels, wherein third cables are connected between the one or more second plug panels and the one or more first plug panels.

8. The apparatus of claim 1 wherein:
the local electrical room module further comprises a transformer mounted on the skid; and
the second cables are electrically connected between the transformer and the one or more first plug panels.

9. The apparatus of claim 1 wherein:
the local electrical room module further comprises a cable spool mounted on the skid; and
the cable spool is configured to reel in and out one or more third cables to a power source located a distance away from the local electrical room module.

10. The apparatus of claim 1 wherein the local electrical room module further comprises:
a radiator mounted on the skid; and
conduit routed from the radiator to the room.

11. The apparatus of claim 1 wherein the room is a first room and the raisable apparatus includes a second room, wherein the one or more first plug panels are disposed on one or more walls of the second room.

12. The apparatus of claim 11 wherein the local electrical room module further comprises:
a rectifier disposed in the first room;
a filter disposed in the first room, wherein an output node of the rectifier is electrically coupled to an input node of the filter;
an inverter disposed in the second room, wherein:
an output node of the filter is electrically coupled to an input node of the inverter via one or more of the second cables; and
an output node of the inverter is electrically coupled to the one or more first plug panels;
a chopper disposed in the first room; and
a brake resistor mounted on the skid, wherein:
the chopper and the brake resistor are serially coupled together; and
the serially coupled chopper and brake resistor are electrically coupled to the inverter.

13. The apparatus of claim 11 further comprising:
a radiator mounted on the skid; and
conduit routed to the second room and attached to and supported at least in part by the boom, wherein the conduit is configured to convey a fluid from the radiator to the second room.

14. The apparatus of claim 1 wherein the raisable apparatus includes a support structure on which the one or more first plug panels are disposed.

15. The apparatus of claim 14 wherein the local electrical room module further comprises:
a rectifier disposed in the room;
a filter disposed in the room, wherein an output node of the rectifier is electrically coupled to an input node of the filter;
an inverter disposed in the room, wherein:
an output node of the filter is electrically coupled to an input node of the inverter; and
an output node of the inverter is electrically coupled to the one or more first plug panels via one or more of the second cables;
a chopper disposed in the room; and
a brake resistor mounted on the skid, wherein:
the chopper and the brake resistor are serially coupled together; and
the serially coupled chopper and brake resistor are electrically coupled to the inverter.

16. The apparatus of claim 14 further comprising a transformer, wherein an output node of the transformer is electrically coupled to the one or more first plug panels via one or more of the second cables.

17. The apparatus of claim 1 wherein the raisable apparatus is the one or more first plug panels.

18. The apparatus of claim 1 further comprising:
a mast mounted on the rig floor structure;
a top drive operable to vertically traverse the mast and rotate a drillstring, wherein one or more of the first cables are electrically coupled between the one or more first plug panels and the top drive;
a drawworks skid attached to the rig floor structure;
a drawworks mounted on the drawworks skid and operable to reel in and out a drill line, wherein one or more of the first cables are electrically coupled between the one or more first plug panels and the drawworks; and
a driller control room, wherein:
the rig floor structure includes support beams;
the driller control room is disposed on the support beams; and
the driller control room includes one or more second plug panels, wherein third cables are connected between the one or more second plug panels and the one or more first plug panels.

19. The apparatus of claim 18 wherein the local electrical room module further comprises:
a transformer mounted on the skid, wherein the second cables are electrically connected between the transformer and the one or more first plug panels;
a cable spool mounted on the skid, wherein the cable spool is configured to reel in and out one or more third cables to a power source located a distance away from the local electrical room module;
a radiator mounted on the skid; and
conduit routed from the radiator to the room.

20. The apparatus of claim 19 wherein the room is a first room and the raisable apparatus includes a second room, wherein the one or more first plug panels are disposed on one or more walls of the second room.

* * * * *